United States Patent [19]

Kitamura et al.

[11] Patent Number: 5,389,973
[45] Date of Patent: Feb. 14, 1995

[54] QUANTIZATION CONTROL CIRCUIT

[75] Inventors: Takuya Kitamura; Yoshihiro Murakami, both of Kanagawa, Japan

[73] Assignee: Sony Corporation, Tokyo, Japan

[21] Appl. No.: 38,806

[22] Filed: Mar. 29, 1993

[30] Foreign Application Priority Data

Apr. 3, 1992 [JP] Japan .................................. 4-110858

[51] Int. Cl.⁶ .............................................. H04N 7/133
[52] U.S. Cl. .......................................... 348/405; 348/27
[58] Field of Search .................................. 348/27, 405

[56] References Cited

U.S. PATENT DOCUMENTS

| | | | |
|---|---|---|---|
| 4,901,075 | 2/1990 | Vogel | 341/63 |
| 5,251,029 | 10/1993 | Enari et al. | 348/405 |

FOREIGN PATENT DOCUMENTS

| | | |
|---|---|---|
| 0517256 | 12/1992 | Japan . |
| 0558016 | 9/1993 | Japan . |
| 2252001 | 7/1992 | United Kingdom . |
| 9105439 | 4/1991 | WIPO . |

*Primary Examiner*—Howard W. Britton
*Assistant Examiner*—Richard Lee
*Attorney, Agent, or Firm*—William S. Frommer; Alvin Sinderbrand

[57] ABSTRACT

A quantization control circuit determines an optimum scaling factor for quantizing orthogonal transformation coefficient data that correspond to a predetermined time period of a digital video signal. A first scaling factor is determined from the orthogonal transformation coefficient data as a function of whether a bit rate determined by quantizing the orthogonal transformation coefficient data using an initial scaling factor is greater than a target bit rate. A corrected scaling factor is determined by calculating second scaling factors that are each derived from the first scaling factor. Error values are calculated from the second scaling factors using the orthogonal transformation coefficient data, and the second scaling factor that corresponds to the minimum error value is selected as the corrected scaling factor.

13 Claims, 8 Drawing Sheets

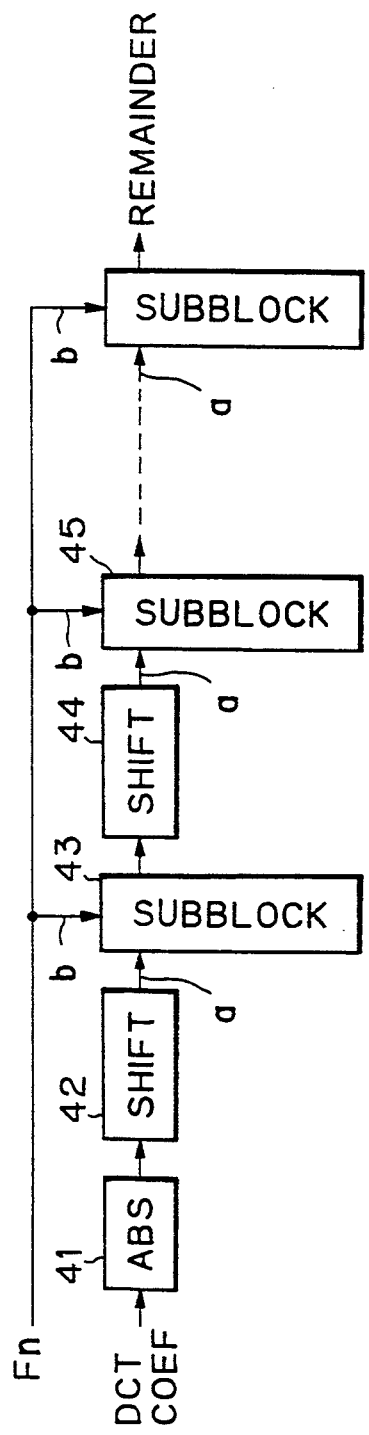

QUANTIZATION CONTROL CIRCUIT

BACKGROUND OF THE INVENTION

1. Field of the Invention

The present invention relates to a quantization control circuit regarding a bit reduction to reduce a bit rate of a digital video signal in a digital video signal recording apparatus.

2. Description of the Prior Art

A digital VTR which records a digital video signal onto a magnetic tape by, for example, a rotary head is known. Since an information amount of the digital video signal is large, a highly efficient coding to compress an amount of data which is transmitted is frequently used. Among various kinds of highly efficient coding methods, a DCT (Discrete Cosine Transform) is more and more put into practical use. The highly efficient coding using DCT is disclosed in the U.S. Pat. No. 5,006,931 which is proposed by the present applicant.

According to the DCT, an image of one frame is converted into a block structure of, for example, (4×4) blocks and each block is subjected to a cosine transforming process as a kind of orthogonal transformation. Thus, coefficient data of (4×4) are generated. Such coefficient data is subjected to a processing of a variable length coding of a run length code, Huffman code, or the like and, after that, it is recorded. In the recording mode, to make a data process on the reproducing side easy, a code signal as a coded output is inserted into a data area of a sync block of a predetermined length and there is performed a frame forming process to construct a sync block such that a sync signal and an ID signal have been added to a code signal.

In a digital VTR using a magnetic tape, a disk recording apparatus using a disk-shaped recording medium, or the like, video data of one field or one frame is generally recorded to a plurality of tracks. However, when a variable length output is formed as in the foregoing DCT, a data amount in a predetermined period of time fluctuates. Therefore, an equal length setting process (also called a buffering) to set a data amount in the predetermined period of time to a target value or less is necessary.

As an example of the equal length setting processes, there has been proposed an equal length setting process for controlling a data amount of a predetermined period of time (referred to as an equal length setting unit) that is shorter than one field or one frame and for setting the data amount to a target value or less even in a whole period of time of one field or one frame. The equal length setting process is a process for again quantizing coefficient data of an AC component generated by the DCT by proper quantization step and for suppressing a transmission data amount to a target value or less. Such quantization step are hereinafter called scaling factors. The scaling factor itself or an ID code to specify it is inserted into the transmission data together with the coded data.

In the quantization, it is necessary to decide the optimum scaling factor every equal length setting unit. Although a stronger data compression can be performed as a value of the scaling factor is large, a picture quality contrarily deteriorates. It is, therefore, necessary to minimize the value of the scaling factor in an allowable range of the bit rate. In the digital VTR, in processes such that an original image signal from, for example, a video camera is coded by the DCT and recorded onto a tape the reproduction data from the first generation tape is decoded and a first generation image is obtained, the same scaling factor can be used between the coding process and the decoding process by referring to the scaling factor or ID code indicative of the scaling factor in the recording/reproduction data.

However, in the dubbing mode such that the first generation image from a playback VTR is transmitted to a recording VTR through an interface and a second generation tape is formed by the recording VTR, it is necessary to use the same scaling factor as the scaling factor used when the first generation image is formed from the original image rather than the scaling factor is set to the minimum value. The same shall also apply to the case the first generation image is processed through a switcher and a special effect generating apparatus and the processed image is recorded. This is because even when the scaling factor is either larger or smaller than such a value, the picture quality deteriorates as compared with the first generation image.

Although the scaling factor can be individually transmitted in a home-use VTR or a communicating system, in a VTR for business use or broadcasting use which generally uses a digital interface such as CCIR601 or the like, it is difficult to transmit the scaling factor or ID code from a viewpoint of its format, so that it is necessary to determine the optimum scaling factor on the recording VTR side.

In the case where the scaling factor was determined on the recording VTR side as mentioned above, it has been found out that the relation between the scaling factor and the bit rate when the first generation image is formed from the original image differs from that in the subsequent multi-generation. FIG. 9 shows the results of experiment in the above case. That is, the relation between the scaling factor (axis of abscissa) and the bit rate (axis of ordinate) is plotted with regard to the case (shown by a solid line) of forming the first generation from the original image and the case (shown by a broken line) of forming the second generation from the first generation.

In the example of FIG. 9, when the target bit rate assumes 4.0 bits/pixel, the scaling factor when the first generation tape is formed from the original image is equal to 73. Subsequently, when the second generation image is formed by dubbing the first generation image which has been quantized by such a value, even in case of the scaling factor of 68, the bit rate can be set into a range. Therefore, the value (=73) when the first generation image is formed from the original image differs form the value (=68) when the second generation image is formed by dubbing. Namely, there is a problem such that the preceding scaling factor cannot be reproduced and the deterioration of the picture quality occurs upon dubbing only from a viewpoint of the restriction of the bit rate and, particularly, by repeating the dubbing process, the deterioration of the picture quality increases.

OBJECTS AND SUMMARY OF THE INVENTION

It is, therefore, an object of the present invention to provide a quantization control circuit which can determine the optimum scaling factor on the basis of the coefficient data irrespective of the first generation image and multi-generation.

According to an aspect of the present invention, there is provided a quantization control circuit of a coding circuit for performing an orthogonal transformation coding, for quantizing a coded output, and for variable length coding the quantized output, comprising:

means to which coefficient data generated in the orthogonal transformation coding is supplied and which is used to determine a scaling factor such that a data amount of the coded output of an equalization length unit is set to a target value or less; and correcting means to which the coefficient data and the scaling factor from the determining means are supplied and which is used for extracting preceding scaling information existing in the coefficient data and for correcting the scaling factor from the determining means on the basis of the extracted scaling information.

The above, and other, objects, features and advantage of the present invention will become readily apparent from the following detailed description thereof which is to be read in connection with the accompanying drawings.

BRIEF DESCRIPTION OF THE DRAWINGS

FIG. 8 is a block diagram of a modification of the second block; and

DETAILED DESCRIPTION OF THE PREFERRED EMBODIMENTS

Figure 1:
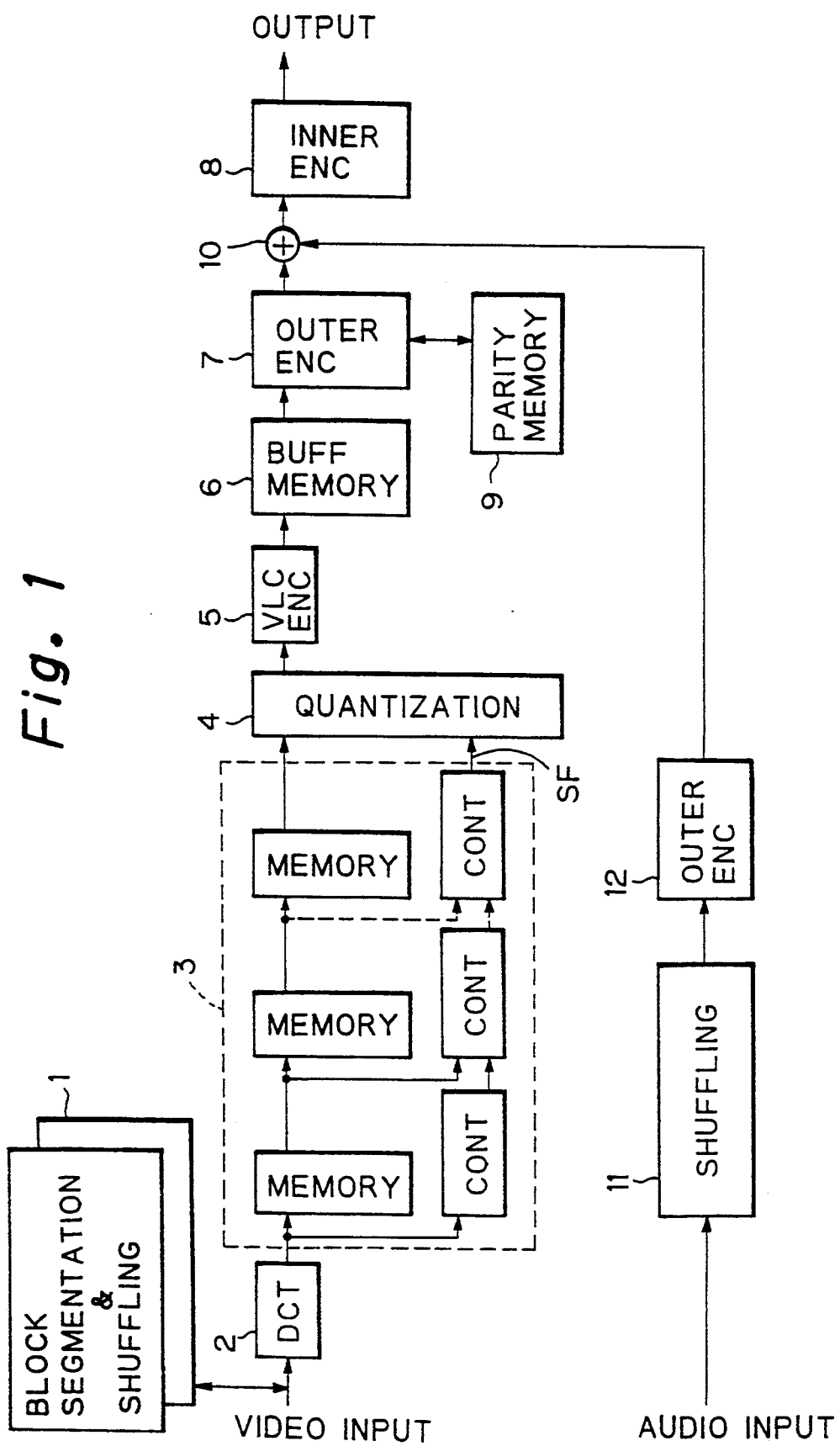
FIG. 1 is a block diagram of a recording system of a digital VTR to which the present invention can be applied.

An embodiments in which the present invention is applied to a digital VTR will now be described hereinbelow with reference to the drawings. FIG. 1 shows a whole construction of a recording system of a digital VTR according to a bit reduction using the DCT. FIG. 1 includes a process of a digital video signal and a process of a PCM audio signal.

A construction of a video system will now be described. First, an input video signal is subjected to block forming process and a shuffling process by a block segmentation and shuffling circuit 1. By the block forming process, video data of the order of a raster scan is converted into data of a structure of, for example, (4×4) DCT blocks. The shuffling denotes a process to change an arrangement by using, for example, a DCT block in one frame as a unit in order to prevent a situation such that errors are concentrated and cannot be corrected because of a scratch of a tape, a clog of the head, or the like and the deterioration of the picture quality consequently becomes conspicuous.

An output of the block segmentation and shuffling circuit 1 is supplied to a DCT (Discrete Cosine Transform) circuit 2 and is orthogonally transformed by the DCT. DCT coefficient data including one DC component data and fifteen AC component data is generated from the DCT circuit 2. The DCT coefficient data is divided into equal length setting units. The optimum scaling factor of each equal length setting unit is decided by a quantization control section 3. A quantizer 4 quantizes the DCT coefficient data by using the scaling factor decided by the control section 3. Namely, the coefficient data of the AC component is divided by the proper scaling factor and the quotient is rounded to an integer. Although the quantization control section 3 according to the present invention comprises the first and second blocks as will be explained hereinlater, only the first block is schematically shown in FIG. 1.

Since the number of bits of the DCT coefficient data which is generated by the DCT and variable length coding process changes depending on a picture pattern as an object to be encoded, quantization to set the number of generation bits of the equal length setting unit which is shorter than a period of time of one field or one frame to a target value or less is executed. The quantization to set the coefficient data of 40 DCT blocks to a target value or less is performed here. The reason why the equal length setting unit is set to be shorter than one track, one field, or one frame is to simplify the circuit.

The quantized DCT coefficient data is supplied to a variable length encoder 5 and is subjected to a process using a run length code, a Huffman code, or the like. After that, the data is subjected to an error correction coding by a buffer memory 6, an outer code encoder 7, and an inner code encoder 8. The inner code encoder 8 also generates the ID signal which is added to the recording data. Although not shown, the recording data is formed by a frame forming process. The recording data is supplied to, for example, two rotary heads through a channel coding circuit and a recording amplifier and recorded onto a magnetic tape.

A product code is used as an error correction code. Coding process of a Reed Solomon code is performed to the data in the horizontal direction and vertical direction, respectively. The error correction code in the horizontal direction (recording direction of the data) is called an inner code. The error correction code in the vertical direction is called an outer code. The buffer memory 6 is a memory to obtain a two-dimensional arrangement constructing the product code. An outer code parity memory 9 is provided with respect to the outer code encoder 7.

An adding circuit 10 is provided between the outer code encoder 7 and the inner code encoder 8. Due to this, audio information which has been recording processed is added. A PCM audio signal is supplied to the adding circuit 10 through a shuffling circuit 11 and an outer code encoder 12.

Figure 2:
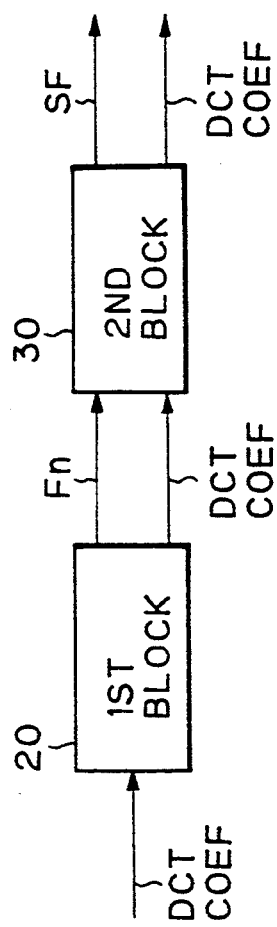
FIG. 2 is a block diagram showing a fundamental construction of a quatization control section to which the present invention is applied.

The present invention relates to the quantization control section 3 in the recording system of the above digital VTR. The quantization control section 3 has a role to decide the scaling factor which is optimum to each equal length setting unit. FIG. 2 shows a whole construction of the quantization control section 3 according to the present invention. The quantization control section 3 can be mainly classified into a first block 20 to decide the minimum scaling factor $F_n$ in a target bit rate by a binary tree searching method and a second block 30 which extracts preceding scaling factor information existing in the DCT coefficient data, thereby enabling the scaling factor to be corrected in the dubbing mode. Each block will now be described.

Figure 3:
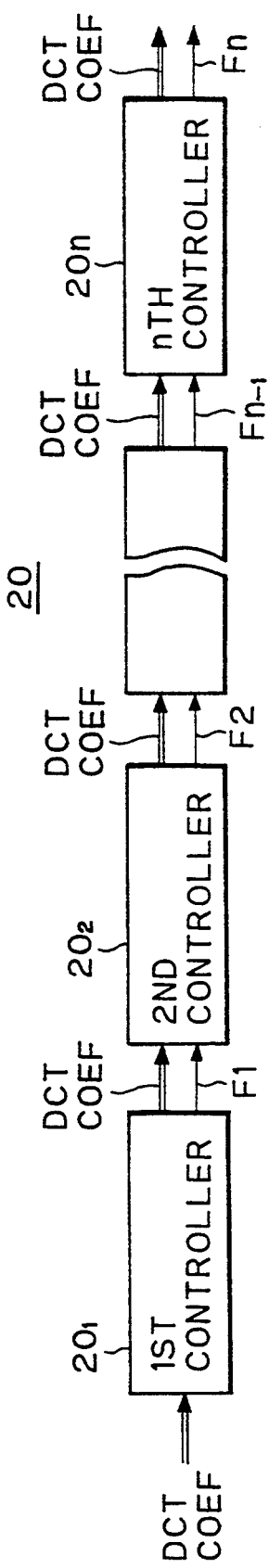
FIG. 3 is a block diagram of an example of a first block of the quantization control section.

The first block 20 executes a process to decide the minimum scaling factor in the target bit rate. As shown in FIG. 3, the first block 20 is constructed by serially connecting quantization controllers $20_1$ to $20_n$ of n stages from the first stage to the nth stage. The DCT coefficient data (DCT COEF) is supplied to each controller and the scaling factor which has been decided here is sent to the next stage. The scaling factor $F_n$ for the second block 30 is extracted from the last controller $20_n$.

It is now assumed that the scaling factor is a code signal of n bits and the total number of scaling factors which can be selected is set to $2^n$. Since the bit rate monotonically decreases with an increase in scaling factor, the scaling factor can be determined on the basis of the binary tree searching method by using such a nature. Namely, in the construction of FIG. 3, the most significant bit of the scaling factor is determined by the controller $20_1$ of the first stage. The next bit is decided by the second stage. The subsequent bit is decided by the third stage. In this manner, the respective bits are determined by the quantization controllers of n stages. The quantization controller of each stage has a construction shown in FIG. 4.

Figure 4:
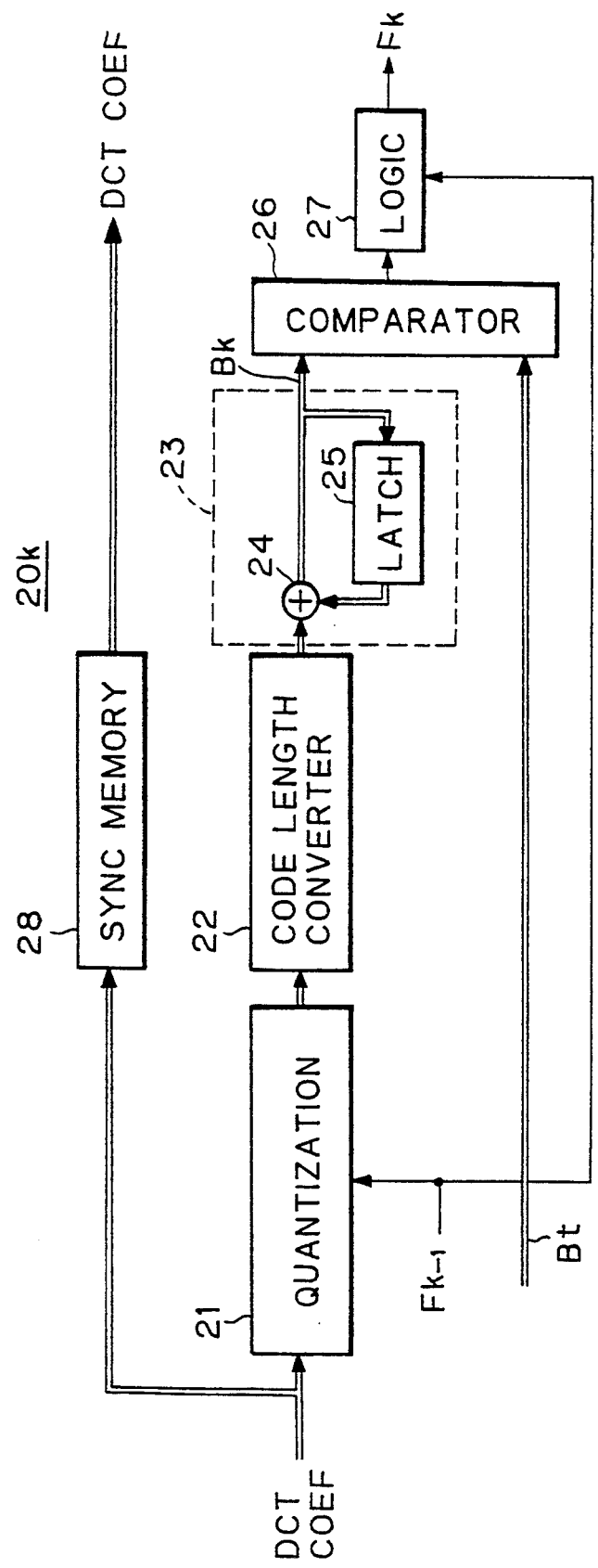
FIG. 4 is a block diagram of an example of one controller in the first block.

In FIG. 4, reference numeral 21 denotes a quantizer to quantize the DCT coefficient data from the front stage by a scaling factor $F_{k-1}$ from the front stage. An output of the quantizer 21 is supplied to a code length converter 22. The converter 22 generates a code length of a variable length code to be generated when the same variable length coding process as that of the variable length encoder 5 in FIG. 1 is executed for each coefficient data. Practically speaking, the converter 22 is formed of an ROM. The code length is supplied to an accumulator 23.

The accumulator 23 is constructed by an adding circuit 24 and a latch 25. The code length and a feedback output of the latch 25 are supplied to the adding circuit 24. An accumulation value $B_k$ in an equal length setting period of time is calculated by the accumulator 23. The accumulation value $B_k$ is supplied to the comparator 26 and compared with a target bit rate $B_t$. An output of a comparator 26 is supplied to a logic circuit 27. The scaling factor $F_{k-1}$ of the front stage is supplied to the logic circuit 27. A scaling factor $F_k$ is obtained form the logic circuit 27. Further, the DCT coefficient data is sent to the next stage through a memory 28 for synchronization (SYNC).

The process at the kth stage shown in FIG. 4 will now be considered.

The quantizer 21 receives the scaling factor $F_{k-1}$ from the front stage and quantizes the DCT coefficient of the equal length setting unit. The code length when the DCT coefficient is variable length coded is obtained by the converter 22 and the sum $B_k$ of the code lengths is obtained by the accumulator 23 on an equal length setting unit basis. The sum $B_k$ is compared with a sum $B_t$ of the codes of the equal length setting unit to realize the target bit rate by the comparator 26. The scaling factor $F_k$ can be obtained as follows by the logic circuit 27. The SYNC memory 28 delays the coefficient data by a time corresponding to only the time needed for the process.

$$F_k = F_{k-1} + 2^{n-k} - 2^{n-k-1} (B_k > B_t)$$

$$F_k = F_{k-1} - 2^{n-k-1} (B_k \leq B_t)$$

Now, assuming that the scaling factor $F_0$ which is supplied to the controller $20_1$ at the first stage assumes $F_0 = 2^n - 1 - 2^{n-1}$, a scaling factor $F_n$ such that the bit rate can be allowed to enter the target value is obtained by the construction of n stages as shown in FIG. 3. Briefly, by performing processes such that the range of the scaling factors which can be selected is divided into halves and $B_k$ and $B_t$ are compared and the range is further subsequently divided into halves and $B_k$ and $B_t$ are compared, the values of the scaling factors are sequentially determined from the most significant bit to the least significant bit and the value at which $B_k \leq B_t$ is set to $F_n$.

Figure 5:
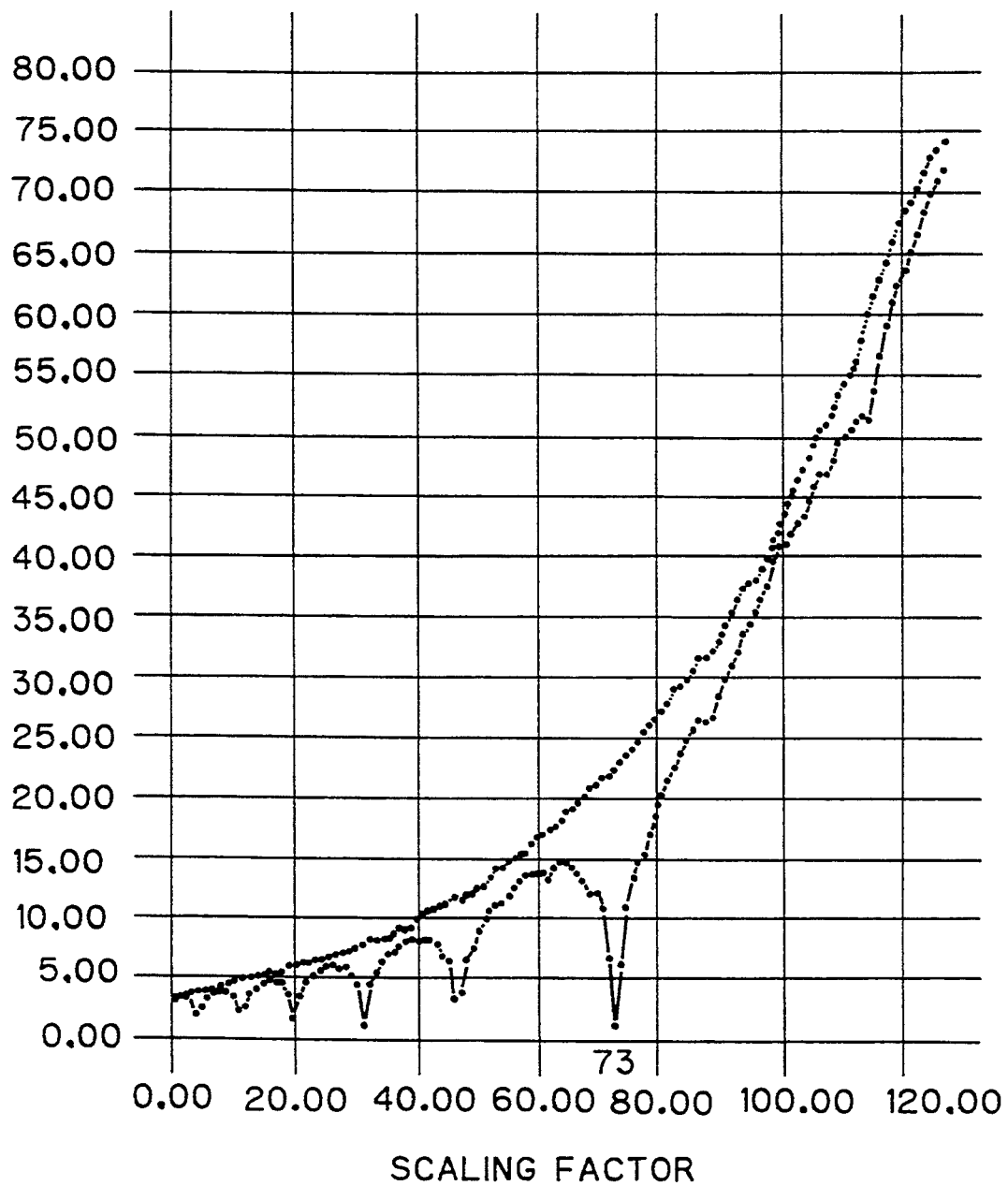
FIG. 5 is a schematic diagram showing an example of the relation between the scaling factor and the error.
Figure 9:
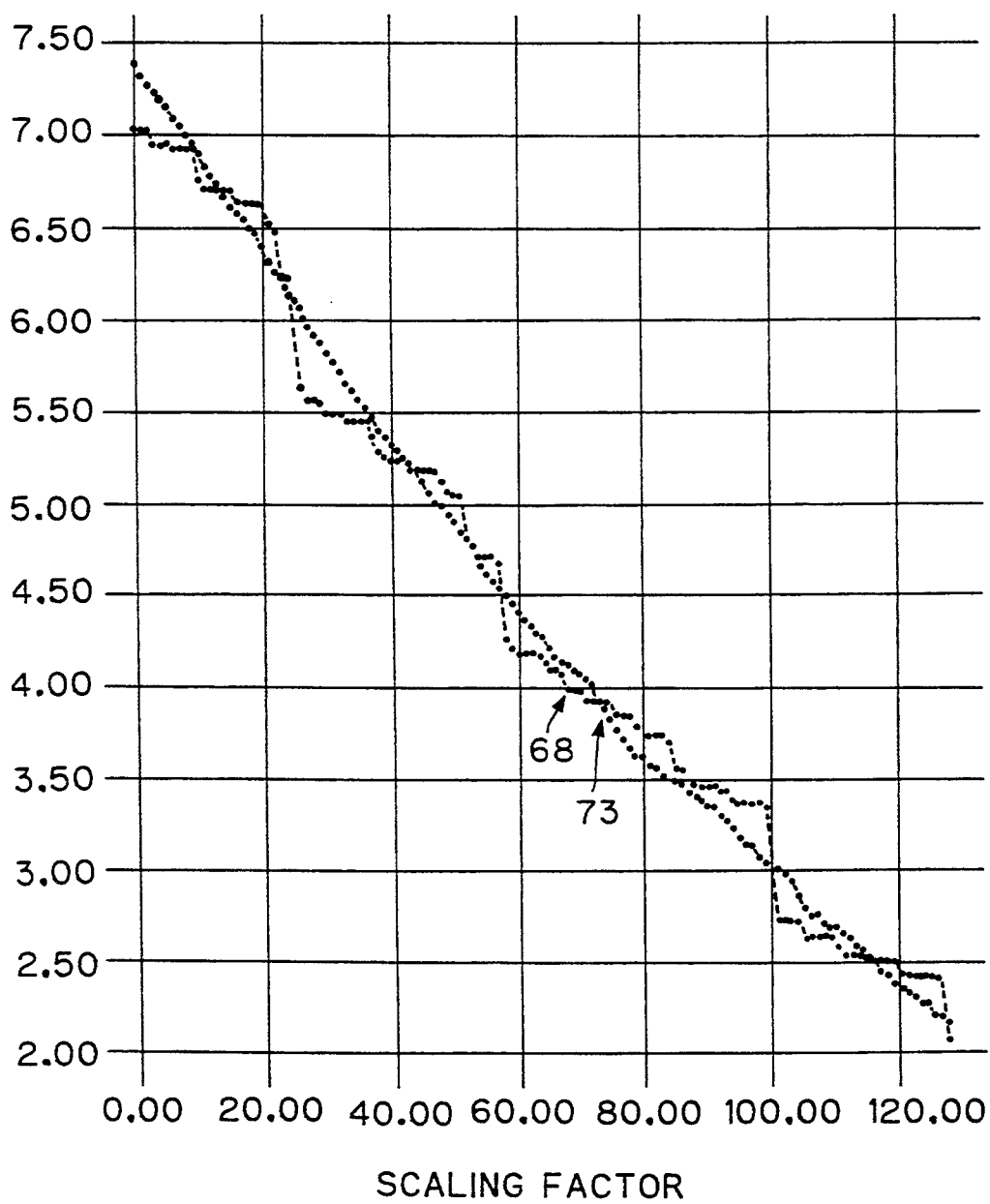
FIG. 9 is a schematic diagram showing an example of the relation between the scaling factor and the bit rate.

The second block 30 will now be described. In this block, as mentioned above, the correction in the dubbing mode is executed to the scaling factor $F_n$ obtained in the first block 20. When the dubbing process is performed, the scaling factor $F_n$ which is determined in the first block 20 is smaller than the value when the first generation image is formed from the original image as described by using the results of the experiments of FIG. 9. However, the quantization is executed by dividing the DCT coefficient by the scaling factor, while the inverse quantization performed by multiplying the scaling factor to the quantized coefficient. When considering the above point, the DCT coefficient when the original image is DCT processed is relatively random. On the other hand, it is presumed that the DCT coefficient when the image obtained by dubbing has been DCT processed has a relation such that it is close to the multiple of the preceding scaling factor. FIG. 5 shows the results of experiments regarding the above presumption.

FIG. 5 is a diagram in which the DCT coefficient data generated from one DCT block is divided by the scaling factor and the remainders are summed on an equal length setting unit (for example, 40 DCT blocks) basis and the sum is normalized (namely, error) and plotted with regard to all of the scaling factors. As shown by a solid line, with respect to the data which is obtained by DCT processing the original image, such an error monotonically increases with the scaling factor. However, when the dubbing is executed to the first generation image formed by quantizing the original image by the scaling factor (=73), the error occurring when the original image has been DCT processed has several minimum values as shown by a broken line. Those minimum values correspond to the point at which the scaling factor is equal to 73 and a point at which there is a relation of measures of such a value.

Therefore, a certain extent of scaling factor is determined by the method of the first block 20 and a check is made to see if the minimum value of the sum (error) of the remainder exists in a portion near such a direction that it is larger than the scaling factor $F_n$ or not and it is sufficient to use such a minimum value as a final scaling factor SF. The reason why such an increasing direction is used is based on a point that when the scaling factor is determined in consideration of only the bit rate as mentioned above, a value smaller than the original scaling factor is obtained. Further, the scaling factor $F_n$ obtained in the first block 20 does not decrease up to the measure and the measure is not erroneously set to the scaling factor.

Figure 6:
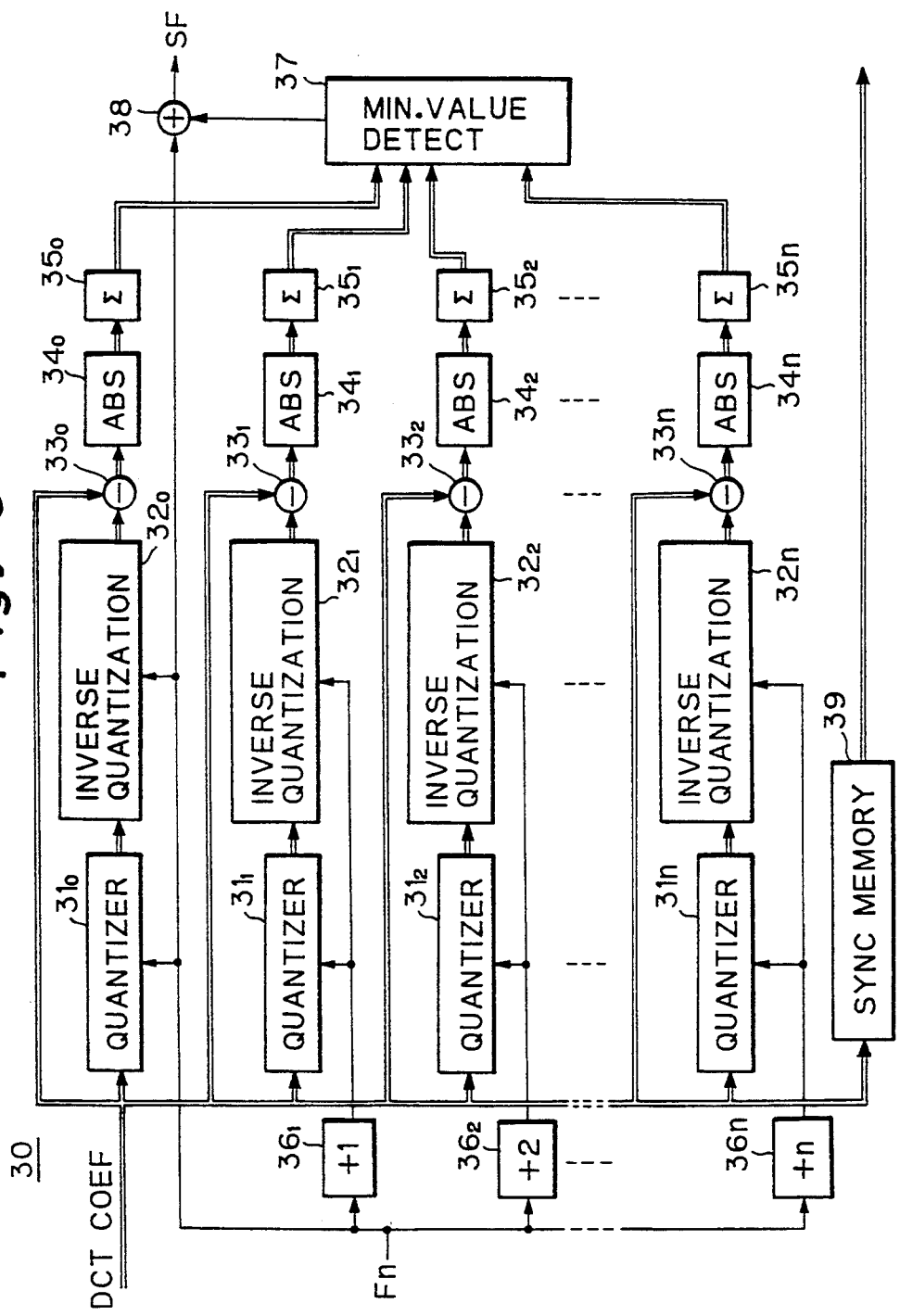
FIG. 6 is a block diagram of an example of a second block of the quantization control section.

By paying an attention to such a point, the second block 30 finds out the scaling factor SF which has such a minimum value by a construction shown in FIG. 6. That is, the DCT coefficient data and scaling factor $F_n$ are supplied from the first block 20 to the second block 30. The correction value (0, 1, 2, . . . , or n) which has been decided as follows is added by an adding circuit 38 and the scaling factor SF is derived.

In FIG. 6, to obtain the error, n sections to which the DCT coefficient data is supplied in parallel. In each section, there are provided quantizers $31_0$ to $31_n$, inverse quantizers $32_0$ to $32_n$, subtracters $33_0$ to $33_n$, absolute value circuits $34_0$ to $34_n$, and accumulators $35_0$ to $35_n$. The highest section in the diagram will now be described. The scaling factor $F_n$ from the first block 20 is directly supplied to the quantizer $31_0$ and inverse quantizer $32_0$ in the highest section.

The DCT coefficient data is quantized in the quantizer $31_0$ by the scaling factor $F_n$ and is subsequently inversely quantized in the inverse quantizer $32_0$. A difference between the resultant data and the original coefficient is obtained by the subtractor $33_0$. The absolute value of the difference is obtained by the absolute value circuit $34_0$. The sum (error) about the equal length setting unit of the absolute value is obtained by the accumulator $35_0$. The error is supplied to a minimum value detecting circuit 37.

With respect to the other sections, in a manner similar to the above, the error regarding the candidate of the scaling factor is obtained and the error is supplied to the minimum value detecting circuit 37. As candidates of the scaling factors, $F_n+1, F_n+2, \ldots, F_n+n$ are used in addition to $F_n$. Those candidates are produced by adding circuits $36_1, 36_2, \ldots, 36_n$ and supplied to the corresponding sections. The minimum value detecting circuit 37 detects the minimum one of the errors obtained in the respective sections and generates correction value 0, 1, 2, . . . , or n corresponding to the detected minimum value. The correction value is supplied to the adding circuit 38. An SYNC memory 39 is provided to match the time.

As mentioned above, the information of the scaling factor can be obtained from only the DCT coefficient data in the dubbing mode and the second generation tape can be obtained by the same scaling factor as the scaling factor used when the first generation image is formed from the original image. For instance, assuming that the scaling factor $F_n$ obtained by the first block 20 is equal to (68), the correction value (5) is added in the second block 30 and the correct scaling factor (SF=73) is obtained.

Further, even when the first generation tape is formed from the original image instead of the case in the dubbing mode, the above quantization control section 3 does not have a fear of malfunction and does not need to switch the operation. This is because in case of forming the first generation tape from the original image, as shown in FIG. 5, there is a relation such that the error as a sum of the remainders monotonically increases for the scaling factor. For instance, when the scaling factor $F_n$ of (73) is obtained in the first block 20, even when the above processes are executed in the second block 30, the error about the scaling factor of (73) is minimum and such a value is outputted as a scaling factor SF.

The present invention is not limited to the above embodiment but can have various kinds of circuit constructions. When the total number of the scaling factors is equal to $2^n$, the first block 20 of the quantization control section 3 need the controllers $20_1$ to $20_n$ of n stages as a whole as shown in FIG. 3. When considering the realization of an IC or the like, there is also a case where it is desirable to use a different construction in accordance with a ratio of scales of the SYNC memory 28 (its scale assumes A) of the controller of FIG. 4 and the other portion (its scale assumes B).

Figure 7A:
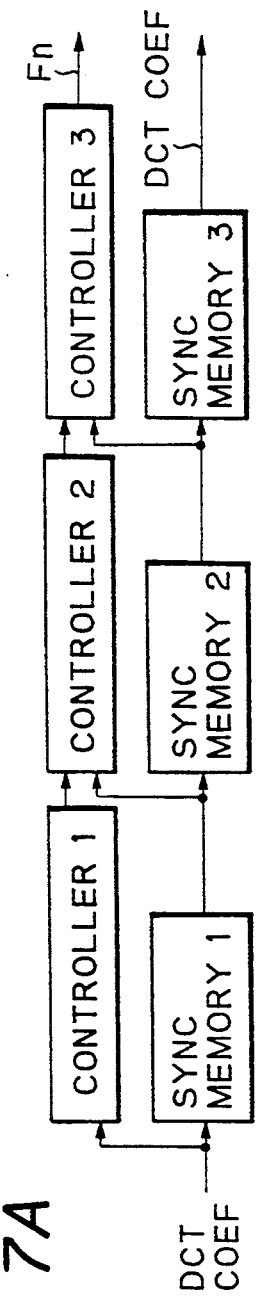
FIGS. 7A–7C are block diagrams of several examples of modified constructions of the first block.
Figure 7C:
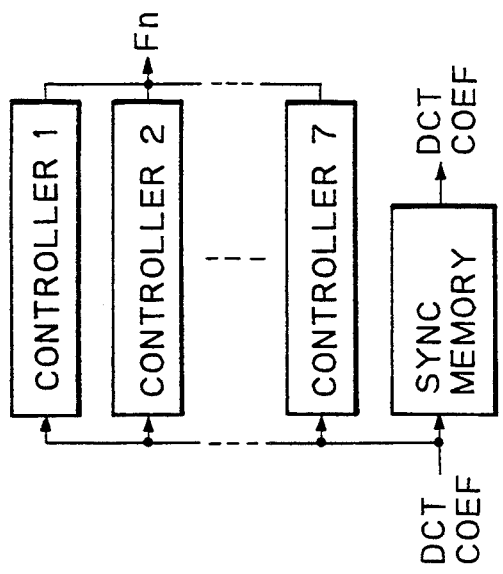
Figure 7B:
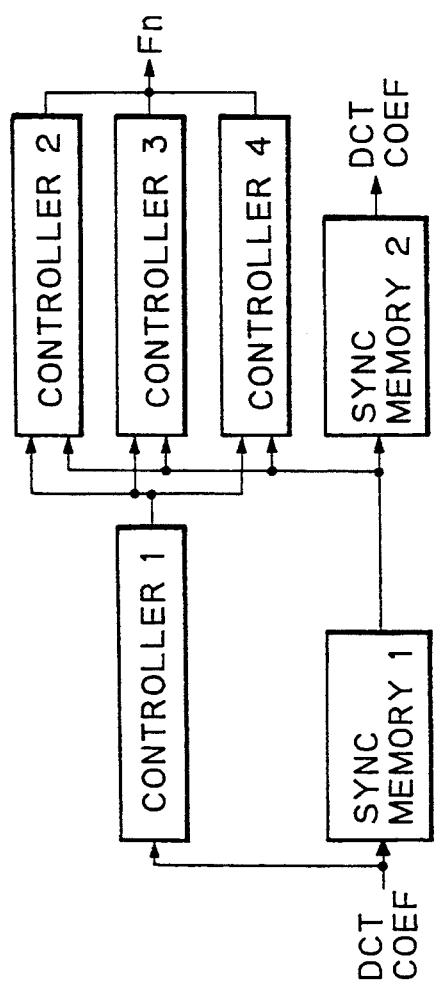

For instance, when n=3, variations as shown in FIGS. 7A-7C are considered in accordance with the ratio of A and B. That is, in case of A>B, a serial 3-stage construction can be realized by the minimum area as shown in FIG. 7A. In case of A<B<3A, as shown in FIG. 7B, it is possible to use a construction of two stages such that one stage which can determine two bits by using three controllers in parallel and one ordinary stage are combined. In FIG. 7A, three SYNC memories are needed. In FIG. 7B, however, it is sufficient to use only two memories. Further, in case of B>3A, as shown in FIG. 7C, by connecting seven controllers in parallel, the processes can be performed by one stage, and it is sufficient to use one SYNC memory. In selection of those variations, it is also possible to consider not only the area but also a delay by the SYNC memory or the like as a condition. As mentioned above, with respect to the first block 20, various constructions are possible in accordance with the number of scaling factors and the condition upon realization.

Variations of the second block 30 of the quantization control section will be further described. Each section in the construction shown as an example in FIG. 6 uses a quantizer, an inverse quantizer, and an adder in order to obtain the remainder. However, in many cases, such a construction is disadvantageous in case of an IC or the like from a viewpoint of the costs. Therefore, a construction as shown in FIG. 8 is considered. According to the construction, pipeline processes are executed by paying an attention to that there is no need to execute the processes in the second block 30 in a real-time manner.

The above processes will now be briefly explained. First, the absolute value of the DCT coefficient obtained by an absolute value circuit 41 is given to a shifting circuit 42, thereby matching the digits of the absolute value and scaling factor. In a subblock 43, the scaling factor b is subtracted from the absolute value of the DCT coefficient. When a subtraction output becomes negative, such a subtraction is not performed but the absolute value a is used as it is. Namely, the subblock 43 compares a and b and generates a-b when (a≧b) and generates a when (a<b).

An output of the subblock 43 is similarly processed in a shifting circuit 44 and a subblock 45. By repeating the above operations, the remainder is calculated. By replacing the construction shown in FIG. 8 to the quantizers $31_0$ to $31_n$, inverse quantizers $32_0$ to $32_n$, and adders $33_0$ to $33_n$ in FIG. 6 and by arranging those component elements in parallel by the same number as the number of candidates of the scaling factors, the above function of the second block 30 can be realized. As compared with the construction of FIG. 6, when an IC is formed, according to the construction of FIG. 8, the second block 30 can be realized by an almost half area.

According to the present invention, as well as the first generation, even in case of the multi-generation such that the information of the scaling factor cannot be received, the optimum scaling factor can be determined from the DCT coefficient data and the deterioration of the picture quality can be prevented.

What is claimed is:

1. A quantization control circuit for determining an optimum scaling factor for quantizing orthogonal transformation coefficient data corresponding to a predetermined period of time of a digital video signal, comprising:

determining means for determining a first scaling factor from said orthogonal transformation coefficient data as a function of whether a bit rate determined by quantizing said orthogonal transformation coefficient data using an initial scaling factor is no greater than a target bit rate; and correcting means for determining a corrected scaling factor by calculating a plurality of second scaling factors each derived from said first scaling factor, calculating a plurality of error values each derived from a respective one of said second scaling factors and from said orthogonal transformation coefficient data, and then selecting a respective one of said plurality of second scaling factors corresponding to a respective one of said plurality of error values having a minimum value as said corrected scaling factor.

2. A circuit according to claim 1, wherein said correcting means includes:

means for calculating said plurality of second scaling factors by adding one of a series of offsets to said first scaling factor, the first one of said series having a value of "0" and the remainder having values increasing by "1"; and a plurality of circuit blocks each comprising means for quantizing the orthogonal transformation coefficient data using one of said second scaling factors, means for inversely quantizing an output of said quantizing means, means for detecting differences between each of an output of said inverse quantizing means and said orthogonal transformation coefficient data, means for calculating the sum of the absolute values of said differences as a respective one of said error values, and means for adding the respective one of said offsets corresponding to the one of said error values having the minimum value as a correction value to said first scaling factor to calculate said corrected scaling factor.

3. A circuit according to claim 1, wherein said correcting means includes:

a plurality of serially connected circuit blocks each comprising shifting means for comparing corresponding digits of an absolute value (a) of the orthogonal transformation coefficient data and the first scaling factor (b), and comparing means coupled in series with said shifting means for generating an output (a−b) when (a≧b) and for generating the output (a) when (a<b).

4. A circuit according to claim 1, wherein said bit rate monotonically decreases with an increase in said first scaling factor and said determining means determines said first scaling factor using a binary tree searching method.

5. A circuit according to claim 4, wherein said first scaling factor is a minimum scaling factor determined by said binary tree searching method.

6. A circuit according to claim 5, wherein said determining means includes a plurality of controllers, each of said plurality of controllers for determining a respective output scaling factor as a function of whether a respective bit rate determined by quantizing said orthogonal transformation coefficient data using a respective input scaling factor is no greater than said target bit rate, the first scaling factor being sequentially determined by said plurality of controllers in the order of the most significant bit of the first scaling factor to the least significant bit.

7. A circuit according to claim 6, wherein each of said controllers comprises:

quantizing means for quantizing said orthogonal transformation coefficient data using the respective input scaling factor supplied to said controller;

means for calculating the bit rate of an output of said quantizing means;

means for comparing said calculated bit rate and said target bit rate; and means for determining the respective output scaling factor from the respective input scaling factor as a function of a comparison output of said comparing means.

8. A circuit according to claim 6, wherein said determining means is arranged such that the first one of said plurality of controllers is serially connected to a parallel connection of the remaining controllers and the respective output scaling factor determined by said first one is supplied to said parallel connection as the respective input scaling factor of said parallel connection.

9. A circuit according to claim 6, wherein said determining means is arranged such that said plurality of controllers are connected in parallel and the orthogonal transformation coefficient data is supplied to said parallel connection.

10. A circuit according to claim 6, wherein when the number of bits of the first scaling factor is equal to n, said controllers are serially connected to form n stages such that the respective output scaling factor determined by one of said n stages is supplied to a succeeding one of said n stages as the respective input scaling factor of said succeeding one of said n stages.

11. A circuit according to claim 10, wherein said determining means further comprises a plurality of memories, each one of said plurality of memories for storing said orthogonal transformation coefficient data to synchronize one of said n stages such that the respective output scaling factor determined by said one of said n stages is supplied to said succeeding one of said n stages at the same time the orthogonal transformation coefficient data is supplied to said succeeding one of said n stages.

12. A quantization control circuit for determining an optimum scaling factor for quantizing orthogonal transformation coefficient data corresponding to a predetermined period of time of a digital video signal, comprising:

determining means for determining a first scaling factor from said orthogonal transformation coefficient data as a function of whether a bit rate determined by quantizing said orthogonal transformation coefficient data using an initial scaling factor is no greater than a target bit rate, said bit rate monotonically decreasing with an increase in said first scaling factor and said first scaling factor being determined using a binary tree searching method; and correcting means for determining a corrected scaling factor and including means for calculating a plurality of second scaling factors by adding one of a series of offsets to said first scaling factor, the first one of said series having a value of "0" and the remainder having values increasing by "1"; and a plurality of circuit blocks each comprising means for quantizing the orthogonal transformation coefficient data using one of said second scaling factors, means for inversely quantizing an output of said quantizing means, means for detecting differences between each of an output of said inverse quantizing means and said orthogonal transformation coefficient data, means for calculating the sum of the absolute values of said differences as a respective one of said error values, and means for adding the respective one of said offsets corresponding to the one of said error values having a minimum value as a correction value to said first scaling factor to calculate a corrected scaling factor.

13. A digital signal compression apparatus for compressing a digital signal, comprising:

means for arranging the digital signal into a plurality of blocks and for shuffling said plurality of blocks;

means for orthogonally transforming the shuffled plurality of blocks into orthogonal transformation coefficient data;

means for dividing said orthogonal transformation coefficient data into equalization length units corresponding to a predetermined period of time of said digital signal;

means for determining an optimum scaling factor for quantizing said orthogonal transformation coefficient data of a respective one of said equalization length units, in which said determining means comprises:

means for determining a first scaling factor from said orthogonal transformation coefficient data as a function of whether a bit rate determined by quantizing said orthogonal transformation coefficient data using an initial scaling factor is no greater than a target bit rate, and correcting means for determining a corrected scaling factor by calculating a plurality of second scaling factors each derived from said first scaling factor, calculating a plurality of error values each derived from a respective one of said second scaling factors and from said orthogonal transformation coefficient data, and then selecting a respective one of said plurality of second scaling factors corresponding to a respective one of said plurality of error values having a minimum value as said corrected scaling factor;

means for quantizing said orthogonal transformation coefficient data using said corrected scaling factor; and means for variable length coding the quantized orthogonal transformation coefficient data.

* * * * *